(12) United States Patent
Johnson et al.

(10) Patent No.: US 8,373,089 B2
(45) Date of Patent: Feb. 12, 2013

(54) COMBUSTION CAP EFFUSION PLATE LASER WELD REPAIR

(75) Inventors: Jere A. Johnson, Greenville, SC (US); Srikanth Chandrudu Kottilingam, Simpsonville, SC (US); Gene Arthur Murphy, Jr., Pelzer, SC (US); Liangde Xie, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 568 days.

(21) Appl. No.: 12/550,740

(22) Filed: Aug. 31, 2009

(65) Prior Publication Data

US 2011/0049112 A1 Mar. 3, 2011

(51) Int. Cl.
*B23K 26/00* (2006.01)

(52) U.S. Cl. ............... 219/121.64; 219/121.66; 219/136

(58) Field of Classification Search .................. None
See application file for complete search history.

(56) References Cited

U.S. PATENT DOCUMENTS

| | | | |
|---|---|---|---|
| 4,726,418 A | 2/1988 | Mihailov | |
| 5,179,261 A | 1/1993 | Perrotti | |
| 5,348,212 A * | 9/1994 | Galanes | 228/135 |
| 5,369,242 A | 11/1994 | Hatfield et al. | |
| 5,451,742 A * | 9/1995 | Nishio et al. | 219/121.64 |
| 5,595,670 A | 1/1997 | Mombo-Caristan | |
| 5,624,585 A * | 4/1997 | Haruta et al. | 219/121.63 |
| 5,726,418 A | 3/1998 | Duthoo | |
| 6,481,969 B2 | 11/2002 | Berry et al. | |
| 6,489,583 B1 | 12/2002 | Nowak et al. | |
| 6,568,077 B1 | 5/2003 | Hellemann et al. | |
| 6,727,459 B1 * | 4/2004 | Bialach | 219/121.64 |
| 6,774,338 B2 | 8/2004 | Baker et al. | |
| 6,908,518 B2 | 6/2005 | Bouse et al. | |
| 6,972,390 B2 | 12/2005 | Hu et al. | |
| 2006/0261045 A1 | 11/2006 | Wang et al. | |
| 2007/0017906 A1 | 1/2007 | Nowak et al. | |
| 2007/0175568 A1 | 8/2007 | Wang et al. | |
| 2008/0029498 A1 | 2/2008 | Forrest et al. | |
| 2008/0116175 A1 | 5/2008 | Ballerini et al. | |
| 2008/0118352 A1 | 5/2008 | Wheeler et al. | |
| 2008/0164301 A1 | 7/2008 | Nowak et al. | |
| 2010/0230390 A1 * | 9/2010 | Nishio et al. | 219/121.64 |
| 2011/0042361 A1 * | 2/2011 | Nowak et al. | 219/121.64 |

FOREIGN PATENT DOCUMENTS

| | | |
|---|---|---|
| EP | 1920864 A1 | 5/2008 |
| EP | 2246144 A1 | 11/2010 |
| JP | 07-132389 | 5/1995 |

* cited by examiner

*Primary Examiner* — Evan Pert
*Assistant Examiner* — Scott R Wilson
(74) *Attorney, Agent, or Firm* — Dority & Manning, P.A.

(57) ABSTRACT

A process for modifying or repairing a metallic component, such as a combustion cap effusion plate for a gas turbine, is disclosed. The method includes generating a notch or groove in the metallic component and depositing a filler material in the notch or groove. A pulsed laser is applied to the filler material. The pulsed laser has a power, frequency, and pulse width sufficient to apply heat to the metallic component and to the filler material to make at least a portion of the metallic component and the filler material melt in order to weld the filler material to the metallic component and repair or modify the metallic component. Various operating parameters of the pulsed laser can be configured to reduce undesirable heating affects.

20 Claims, 4 Drawing Sheets

COMBUSTION CAP EFFUSION PLATE LASER WELD REPAIR

FIELD OF THE INVENTION

The present invention relates generally to modification of metallic components, and more particularly to a process for repairing damage to metallic components of gas turbines, such as, for example, a combustion cap effusion plate.

BACKGROUND OF THE INVENTION

Gas turbines typically include various metallic components that sustain damage during operation of the gas turbine. This is particularly true for metallic components formed from thin metallic plates that include a plurality of through-holes. For instance, combustion cap effusion plates used in combustion chamber assemblies often sustain damage such as cracks or fractures due to the dynamic loading resulting from combustion in a combustion chamber assembly. It is desirable to repair such damage without having to replace the entire metallic component.

Previously, weld repair of such damage using standard MIG (metal inert gas) or TIG (tungsten inert gas) welding techniques has been performed with limited success. The higher heat effects resulting from MIG or TIG welding processes often lead to crack propagation and difficulty in containment of damage. For instance, the heat affected zone generated by such MIG and TIG welding techniques often overlaps into the undamaged area of the effusion plate, which can lead to more damage.

Brazing processes are also known for repairing damage to metallic components of a gas turbine. Brazing is typically more successful than MIG or TIG welding. However, brazing is much more expensive and time consuming due to the necessary cleaning and brazing furnace cycles. Moreover, it is often difficult to perform the brazing techniques in situ, making convenient and timely repair of damaged articles more difficult.

Accordingly, a process for repairing metallic components of gas turbines that addresses at least certain of the present disadvantages associated with MIG/TIG welding and brazing would be useful.

BRIEF DESCRIPTION OF THE INVENTION

Aspects and advantages of the invention will be set forth in part in the following description, or can be obvious from the description, or can be learned through practice of the invention.

One exemplary embodiment of the present invention provides for a method for modifying a metallic component. The method includes generating a groove in the metallic component at a location on the metallic component. The method further includes depositing a filler material in the groove and applying a pulsed laser to the filler material. The pulsed laser has a power, a frequency, and a pulse width sufficient to apply heat to the metallic component and filler material and make them melt. The heat from the pulsed laser operates to weld the filler material to the metallic component to modify the metallic component.

Various additions or modifications can be made to this exemplary embodiment of the invention.

For instance, another exemplary embodiment of the present invention provides for a method for repairing a metallic component for a gas turbine. The method includes blending a fracture from the metallic component to create a notch in the metallic component. The method further includes depositing a filler material in the notch and directing a pulsed laser onto the filler material. The pulsed laser has a power, a frequency, and a pulse width sufficient to apply heat to the metallic component and filler material and make them melt. The heat from the pulsed laser welds the filler material to the metallic component to modify the metallic component.

A further exemplary embodiment of the present invention provides for a method of modifying a combustion cap effusion plate for a gas turbine. The method includes blending the fracture from the effusion plate to create a notch in the effusion plate. The method includes depositing a filler material in the notch and directing a pulsed laser onto the filler material. The pulsed laser has a frequency of about 3.5 Hz to about 20 Hz, a pulse width of about 4.0 ms to about 15.0 ms, and a travel speed of about 0.4 mm/sec to about 1.5 mm/sec. The pulsed laser generates a heat sufficient to melt and weld the filler material to the effusion plate to modify the effusion plate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, directed to one of ordinary skill in the art, is set forth in the specification, which makes reference to the appended figures, in which.

DETAILED DESCRIPTION

Figure 1:
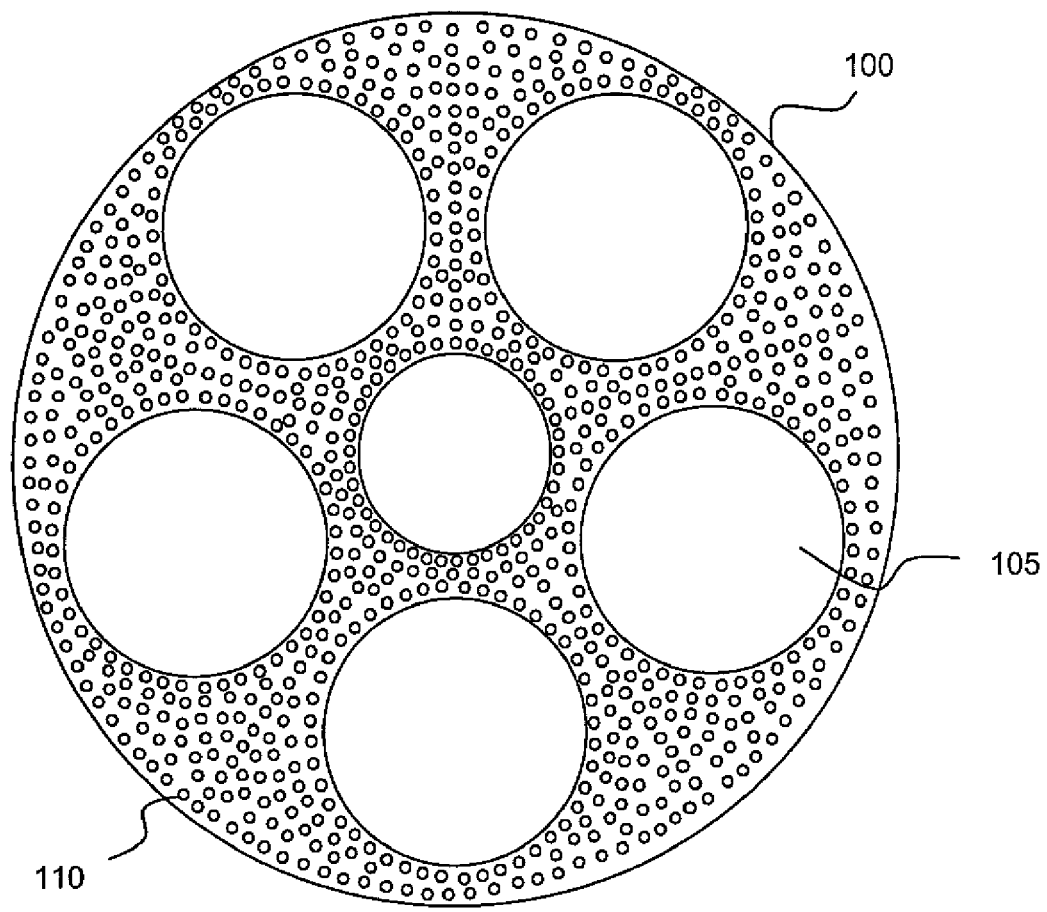
FIG. 1 depicts a plan view of an exemplary combustion cap effusion plate that can be used in a combustion chamber assembly of a gas turbine.

To provide advantageous improvements as described herein, the present invention provides a method of repairing a metallic component of a gas turbine. For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Referring now to FIG. 1, an exemplary combustion cap effusion plate 100 in the form of a thin metallic plate having a plurality of effusion cooling holes 110 is illustrated. Although the present disclosure will be described in detail with reference to the repair of damage to effusion plate 100, those of ordinary skill in the art, using the disclosure provided herein, should understand that the present disclosure is not limited to the repair of a combustion cap effusion plate, but rather is intended to encompass the repair of a variety of metallic components.

Effusion plate 100 is typically placed at the end of a combustion cap adjacent to a combustion chamber in a combustion chamber assembly for a gas turbine. Effusion plate 100 includes a plurality of openings 105 for the insertion of fuel nozzles through the combustion cap and into the combustion chamber assembly. The array of effusion cooling holes 110 allow for effusion cooling during the combustion of gases in the adjacent combustion chamber. Effusion plate 100 functions as a radiation shield for a combustion cap that shields the combustion cap from radiation heat release resulting from combustion during operation in an adjacent combustion zone.

Effusion plate 100 is typically made from a highly-corrosion resistant metal alloy that can withstand high temperature and high stress conditions. For instance, effusion plate 100 can be manufactured from a nickel-based or a cobalt-based alloy. In particular embodiments, effusion plate 100 can be manufactured from a solid solution strengthened alloy such as, for example, Hastelloy X, Haynes 230, Inconel 617, Inconel 625, or other similar alloys. In other embodiments, effusion plate 100 can be manufactured from a precipitation strengthened hardenable alloy such as, for example, Haynes 282, Waspaloy, Nimonic 263, or other similar alloys.

Figure 2:
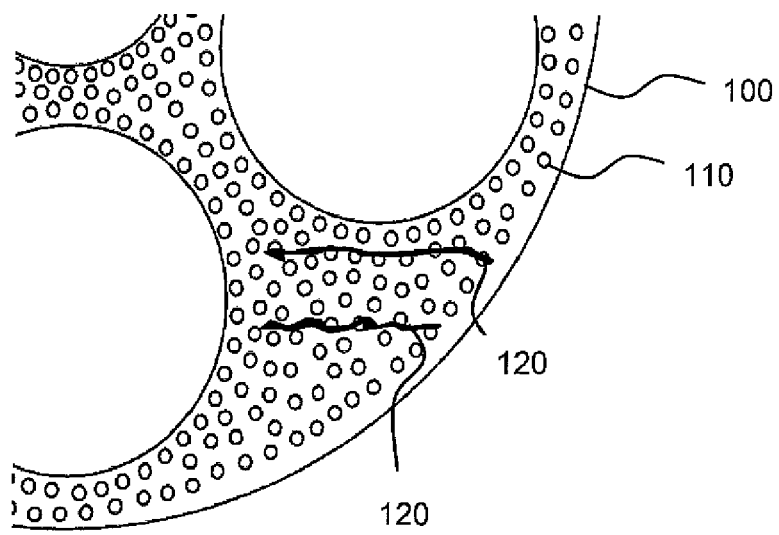
FIG. 2 depicts exemplary damage to an exemplary combustion cap effusion plate that can be used in a combustion chamber assembly of a gas turbine.

Effusion plate 100 typically has a relatively small thickness, such as less than about 0.25 inches (about 6.35 mm). The relatively small thickness of effusion plate 100, coupled with the plurality of effusion cooling holes 110, makes the effusion plate 100 susceptible to damage during combustion system dynamic loading. For instance, as illustrated in FIG. 2, effusion plate 100 can sustain damage in the form of cracks or fractures 120.

Previously, weld modification of such damage 120 using standard MIG (metal inert gas) or TIG (tungsten inert gas) welding techniques has been performed with limited success. The higher heat effects resulting from MIG or TIG welding processes often lead to crack propagation and difficulty in containment of damage. For instance, the heat affected zone generated by such MIG and TIG welding techniques often overlaps into the undamaged area of the effusion plate, which can lead to more damage. This is particularly true for an effusion plate 100 which is formed from a thin metallic plate having an array of effusion cooling holes 110.

Brazing processes are also known for repairing damage to metallic components of a gas turbine such as effusion plate 100. Brazing is typically more successful than MIG or TIG welding. However, brazing is much more expensive and time consuming due to the necessary cleaning and brazing furnace cycles. Moreover, it is often difficult to perform the brazing techniques in situ, making convenient and timely repair of damages article more difficult.

In accordance with the present disclosure, the disadvantages of brazing and MIG/TIG welding are overcome by use of a pulsed laser weld technique that is less expensive to implement than standard brazing techniques and also avoids the undesirable heating effects of standard MIG/TIG welding. By using the pulsed laser welding techniques of the present disclosure, a relatively thin metallic component of a gas turbine with a plurality of cooling holes, such as a combustion cap effusion plate, can be conveniently and timely repaired without crack propagation or crack containment difficulty caused by undesirable heating effects.

Figure 3:
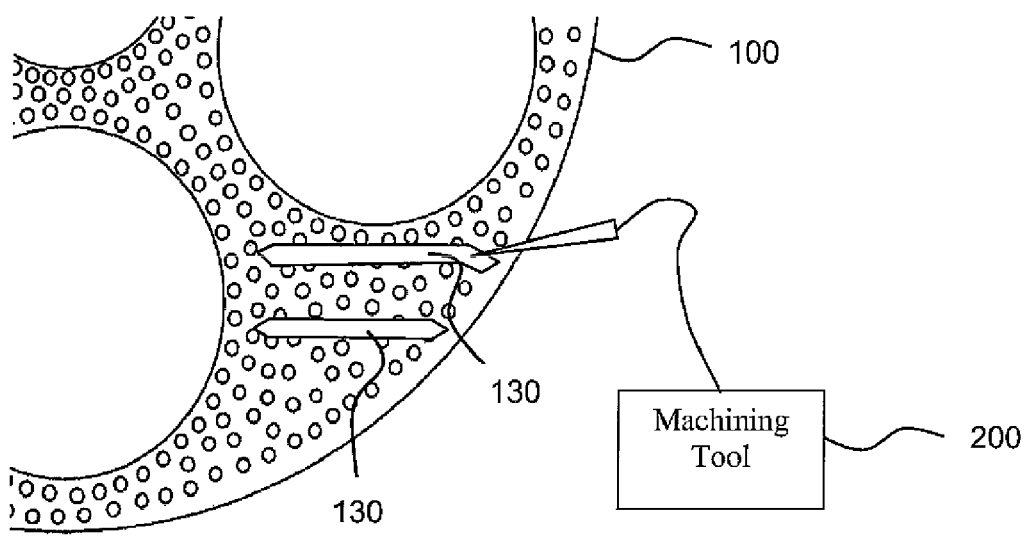
FIG. 3 depicts generating a notch or groove at the location of damage in an exemplary combustion cap effusion plate according to one exemplary embodiment of the present disclosure.
Figure 4:
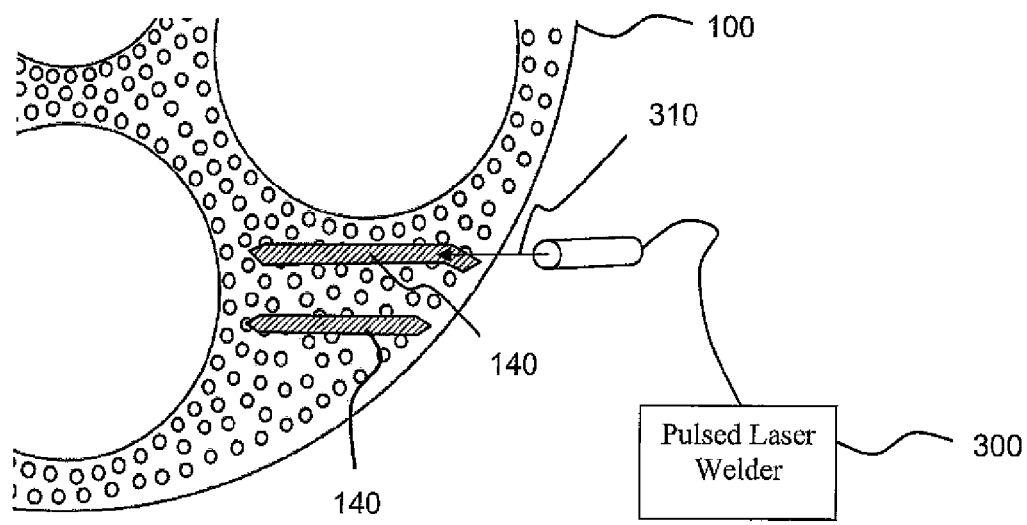
FIG. 4 depicts applying a pulsed laser to weld filler material to an exemplary combustion cap effusion plate according to one exemplary embodiment of the present disclosure.

Referring now to FIGS. 2-4, an exemplary process for modification or repair of effusion plate 100 using the exemplary pulsed laser welding techniques of the present disclosure will now be discussed in more detail. As illustrated in FIG. 2, effusion plate 100 includes damage in the form of cracks or fractures 120. The cracks or fractures 120 may have been generated due to dynamic loading of the combustion system.

To modify damage 120 to effusion plate 100, damaged portions 120 of effusion plate 100 are first removed. Damaged portions 120 can be removed by generating a notch or groove 130 in effusion plate 100 at the location of damage 120 as depicted in FIG. 3. Preferably, notch or groove 130 has a size and configuration that is larger in area than that of damage 120 but is small enough to reduce stresses to effusion plate 100.

Notch or groove 130 can be generated using any technique(s) known to those of ordinary skill in the art. For instance, notch or groove 130 can be generated by blending the damage 120 from effusion plate 100 using a machining tool 200. Machining tool 200 can be any tool or device for machining away damage 120 from effusion plate 100. For instance, machining tool 200 can include a rotary grinding tool that grinds away the damaged portions of effusion plate 100 to form notch or groove 130.

The depth of notch or groove 130 will depend on the type of damage 120 sustained by effusion plate 100. For instance, if damage 120 is a partial wall thickness crack or fracture, the depth of notch or groove 130 will depend on the depth of the partial wall thickness fracture. Preferably, the depth of notch or groove 130 will be slightly larger than that of the partial wall thickness fracture to prevent further crack propagation. If damage 120 is a through-wall thickness crack or fracture, the depth of notch or groove 130 may have to extend through the entire thickness of effusion plate 100 in order to ensure proper modification or repair of effusion plate 100 and prevention of crack propagation.

After notch or groove 130 has been generated into effusion plate 100, a filler material 140 is deposited in the notch or groove 130. Filler material 140 can be any of a variety of welding filler materials known in the art. In certain embodiments, filler material 140 is a high-strength, thermally stable, highly oxidation resistant metal alloy. For instance, filler material 140 can be a solid solution strengthened alloy such as, for example, Hastelloy X, Hastelloy W, Haynes 230, Inconel 617, Inconel 625, or other similar alloy. In other embodiments, filler material 140 can be a precipitation strengthened hardenable alloy such as, for example, Haynes 282, Waspaloy, Nimonic 263, or other similar alloy.

Filler material 140 can be deposited in the notch or groove 130 by placing a filler wire 155 (depicted in FIGS. 5 and 6) of filler material 140 in the notch or groove 130 and heating the filler wire 155 using the pulsed laser techniques discussed in the present disclosure. Filler wire 155 can have a diameter in the range of about 0.010 inches (about 0.254 mm) to about 0.045 inches (about 1.143 mm), such as about 0.025 inches (about 0.635 mm) to about 0.035 inches (about 0.889 mm), such as about 0.030 inches (about 0.762 mm), or any other diameter or range of diameters therebetween. Those of ordinary skill in the art, using the disclosures provided herein, should understand that the filler material can be of any other shape.

Figure 5:
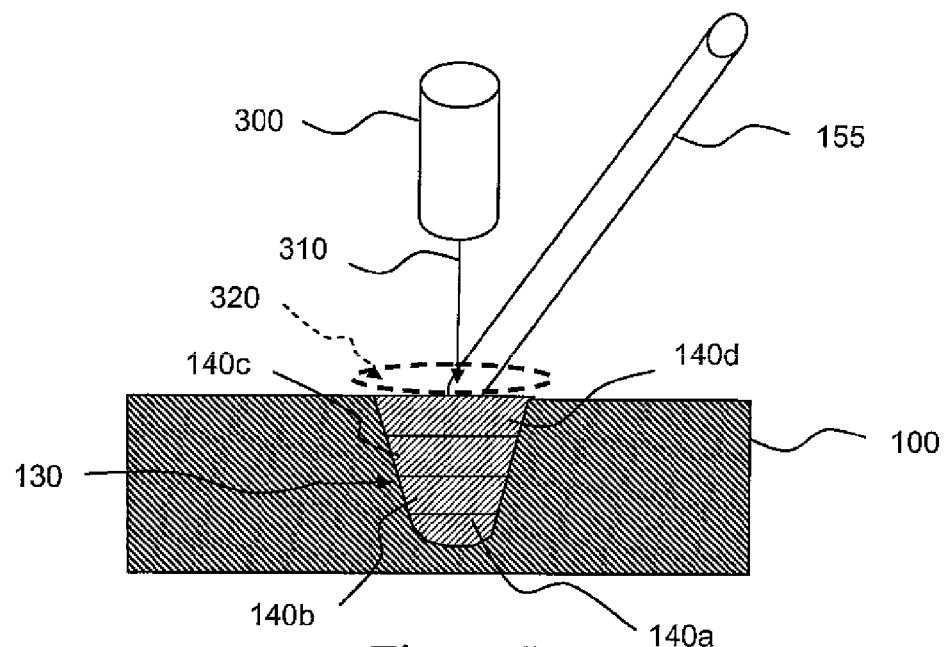
FIG. 5 depicts a cross-sectional view of an exemplary laser weld repair process for repairing a partial wall thickness crack in an exemplary combustion cap effusion plate according to one exemplary embodiment of the present disclosure.
Figure 6:
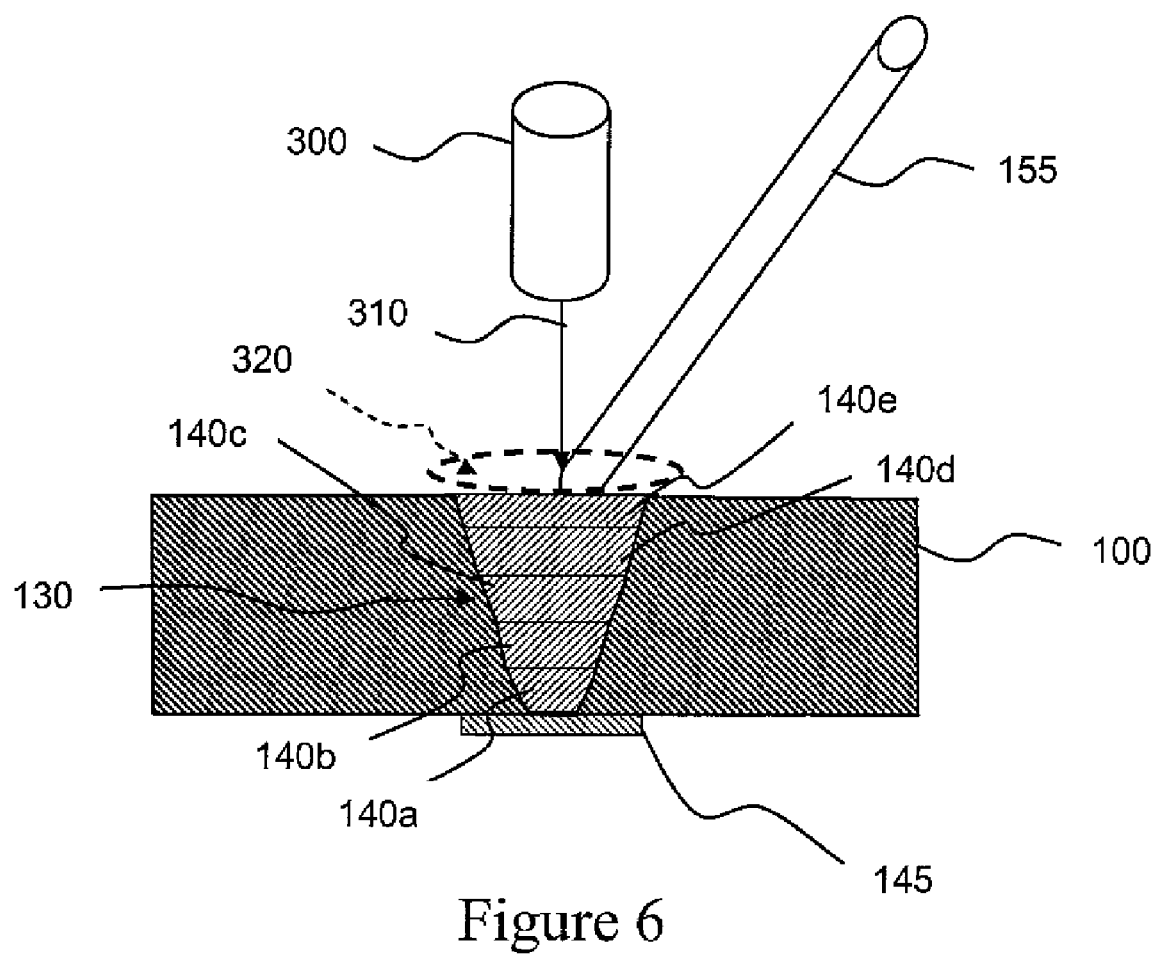
FIG. 6 depicts a cross-sectional view of an exemplary laser weld repair process for repairing a through-wall thickness crack in an exemplary combustion cap effusion plate according to one exemplary embodiment of the present disclosure.

As shown in FIG. 4, a pulsed laser 310 is applied to filler material 140 in order to weld filler material 140 to effusion plate 100. Pulsed laser 310 can be a $CO_2$ laser, a lamp pumped laser, a fiber laser, or any other type of laser. The pulsed laser 310 applies a pulse of high energy and short duration that is sufficient to weld filler material 140 to effusion plate 100. The pulsed laser 310 generates a heat affected zone 320 as illustrated in FIGS. 5 and 6. As will be discussed in detail below, various parameters of pulsed laser 310 can be varied or modified to control the size of heat affected zone 320 so that undesirable heating affects can be reduced.

Pulsed laser 310 is provided by laser welder 300. Laser welder 300 can be any of a variety of pulsed laser welders known in the art. For instance, laser welder 300 can be similar to the laser welders described and disclosed in U.S. Pat. No. 5,179,261, 5,369,242, 5,726,418, or 6,774,338.

In a particular embodiment, laser welder 300 is the HTS Mobile 200 laser welder manufactured by OR Laser, Inc. This exemplary laser welder allows for transverse mobility in the x, y and z directions and has a mean output power of about 200 W. The peak output power provided by the HTS Mobile 200 laser welder is about 9 kW. The HTS Mobile 200 laser welder allows for welding precision to about 0.1 mm.

With reference now to FIG. 5, an exemplary process for modifying a partial wall thickness crack or fracture will be discussed in detail. As shown, notch or groove 130 has already been generated in effusion plate 100. A first layer of 140a of filler material has been deposited in notch or groove 130. Pulsed laser 310 has been passed over filler material layer 140a. Pulsed laser 310 applied several pulses of high energy and short duration sufficient to weld filler material 140 to effusion plate 100 to form layer 140a. As shown, this process has been repeated with the appropriate number of passes to weld layers 140b, 140c, and 140d to effusion plate 100 until notch or groove 130 is filled.

Referring now to FIG. 6, an exemplary process for modifying a through wall thickness crack or fracture will be discussed in detail. As shown, notch or groove 130 has already been generated in effusion plate 100. A shim material 145 has been welded to the back surface of effusion plate 100. Shim material 145 is used to provide a backing surface for filler material 140. Shim material 145 may comprise a nickel-based or cobalt-based metal alloy. For instance, shim material may be manufactured from a solid solution strengthened alloy such as, for example, Hastelloy X, Hastelloy W, Haynes 230, Inconel 617, or Inconel 625.

A first layer 140a of filler material has been deposited in notch or groove 130. Pulsed laser 310 has been passed over filler material layer 140a. Pulsed laser 310 applied several pulses of high energy and short duration sufficient to weld filler material to effusion plate 100 to form layer 140a. As shown, this process has been repeated with the appropriate number of passes to weld layers 140b, 140c, 140d, and 140e to effusion plate 100 until notch or groove 130 is filled.

As illustrated in both FIGS. 5 and 6, pulsed laser 310 generates heat affected zone 320. When welding a metallic component of a gas turbine having a plurality of through-holes, such as effusion plate 100, it is desirable to reduce heat affected zone 320 so that undesirable heat affects resulting from the welding are avoided. In this manner, damage to effusion plate 100 can be more easily contained and crack propagation can be avoided.

Various operating parameters of pulsed laser 310 can be adjusted to achieve a desired heat affected zone 320 that is large enough to weld filler material 140 to effusion plate 100, but small enough to reduce undesirable heating of the effusion plate. For instance, pulsed laser 310 can have a frequency and a pulse width. The frequency of pulsed laser 310 can be in the range of about 3.5 Hz to about 20 Hz, such as about 4.0 Hz to about 6.0 Hz, such as about 5.0 Hz, or 5.5 Hz, or any other frequency or range of frequencies therebetween. The pulse width of pulsed laser 310 can be in the range of about 4.0 ms to about 15.0 ms, such as about 5.0 ms to about 8.0 ms, such as about 6.0 ms, or 7.0 ms, or any other pulse width or range of pulse widths therebetween. In addition, the pulsed laser can have a travel speed in the range of about 0.4 mm/sec to about 1.5 mm/sec, such as about 0.5 mm/s to about 0.8 mm/s, such as about 0.6 mm/s, or 0.7 mm/s, or any other travel speed or range of travel speeds therebetween. The pulsed laser 310 can also have a diameter in the range of about 0.1 mm to about 2 mm, such as about 0.5 mm to about 1.5 mm, such as about 1.0 mm, or 1.2 mm, or any other diameter or range of diameters therebetween. The laser welder used to provide pulsed laser 310 can have a mean output power of about 200 W and a peak output power of about 9 kW. The laser welder can be operated in the range of about 55% to about 60% power, such as about 57% power.

A pulsed laser exhibiting the above operating parameters can deliver a pulse of high energy and short duration sufficient to weld filler material 140 to effusion plate 100 while maintaining a desired heat affected zone. The heat affected zone will be large enough to weld the filler material to the effusion plate but not so large as to substantially extend into undamaged portions of the effusion plate. In this manner, crack containment and prevention of crack propagation arising from undesirable and unnecessary heating affects can be achieved. Thus, the laser welding techniques according to the present disclosure provide advantages over MIG/TIG welding and brazing processes known in the art.

While the present subject matter has been described in detail with respect to specific exemplary embodiments and methods thereof it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of modifying a metallic component, the method comprising:
   generating a groove in said metallic component at a location on said metallic component;
   depositing a filler material in said groove;
   applying a pulsed laser to said filler material, said pulsed laser having a power, a frequency, and a pulse width sufficient to apply heat to said metallic component and said filler material to make at least a portion of said metallic component and said filler material melt;
   wherein said heat from said pulsed laser welds said filler material to said metallic component to modify said metallic component.

2. The method of claim 1, wherein said pulsed laser generates a heat affected zone, said method comprising configuring the size of said heat affected zone by adjusting said power, said pulse width or said frequency of said pulsed laser.

3. The method of claim 1, wherein said frequency of said pulsed laser is from about 3.5 Hz to about 20 Hz.

4. The method of claim 1, wherein said pulse width of said pulsed laser is from about 4.0 ms to about 15.0 ms.

5. The method of claim 1, wherein said pulsed laser has a travel speed from about 0.4 mm/sec to about 1.5 mm/sec.

6. The method of claim 1, wherein said pulsed laser has a diameter of about 0.1 mm to about 2.0 mm.

7. The method of claim 1, wherein said metallic component has a thickness of less than about 0.25 inches and comprises a plurality of through-holes.

8. The method of claim 6, wherein said metallic component is a combustion cap effusion plate for a gas turbine.

9. The method of claim 1, wherein said metallic component comprises a nickel-based or cobalt-based metal alloy and said filler material comprises a nickel based or cobalt-based filler material.

10. The method of claim 1, wherein said filler material is deposited from a filler wire having a diameter of about 0.010 inches to about 0.045 inches.

11. The method of claim 1, wherein said location comprises a partial wall thickness fracture.

12. The method of claim 1, wherein said location comprises a through-wall thickness fracture.

13. The method of claim 12, wherein said method comprises applying a shim material to operate as a backing surface for said groove.

14. The method of claim 1, wherein said step of generating said groove comprises mechanically removing said location from said metallic component.

15. The method of claim 1, wherein said method comprises welding a plurality of layers of filler material to said metallic component with said pulsed laser so that said groove is completely filled with filler material.

16. A method of modifying a metallic component for a gas turbine, the method comprising:
blending a fracture from said metallic component to create a notch in said metallic component;
depositing a filler material in said notch;
directing a pulsed laser onto said filler material, said pulsed laser having a power, a frequency and a pulse width sufficient to apply heat to said metallic component and said filler material to make at least a portion of said metallic component and said filler material melt;
wherein said heat from said pulsed laser welds said filler material to said metallic component to modify said metallic component.

17. The method of claim 16, wherein said frequency of said pulsed laser is from about 15 Hz to about 20 Hz.

18. The method of claim 16, wherein said pulse width of said pulsed laser is from about 4.0 ms to about 15 ms.

19. The method of claim 16, wherein said pulsed laser has a travel speed from about 0.4 mm/sec to about 1.5 mm/sec.

20. A method for modifying a combustion cap effusion plate for a gas turbine, the method comprising:
blending a fracture from said effusion plate to create a notch in said effusion plate;
filling said notch with a filler material;
directing a pulsed laser onto said filler material, said pulsed laser having a frequency of about 3.5 Hz to about 20 Hz, a pulse width of about 4.0 ms to about 15.0 ms, and a travel speed from about 0.4 mm/sec to about 1.5 mm/sec;
wherein said pulsed laser generates a heat affected zone sufficient to weld said filler material to said effusion plate to modify said effusion plate.

* * * * *

UNITED STATES PATENT AND TRADEMARK OFFICE
CERTIFICATE OF CORRECTION

| | |
|---|---|
| PATENT NO. | : 8,373,089 B2 |
| APPLICATION NO. | : 12/550740 |
| DATED | : February 12, 2013 |
| INVENTOR(S) | : Johnson et al. |

It is certified that error appears in the above-identified patent and that said Letters Patent is hereby corrected as shown below:

Title Page, Item (56) References Cited: US Patent Documents, "6,489,583 B1 12/2002 Nowak et al." should read --6,489,583 B1 12/2002 Feng et al.--.

In the Claims:

At Column 8, in Claim 17, line 15 "15 Hz to about 20 Hz" should read --3.5 Hz to about 20Hz--.

Signed and Sealed this
Fourteenth Day of May, 2013

Teresa Stanek Rea
*Acting Director of the United States Patent and Trademark Office*